United States Patent
Phung et al.

(10) Patent No.: US 6,510,377 B2
(45) Date of Patent: Jan. 21, 2003

(54) ENVIRONMENTAL TRAFFIC RECOGNITION IDENTIFICATION PREDICTION STRATEGIES

(75) Inventors: Tam A. Phung, Sunnyvale, CA (US); Ronald C. Allison, Clio, MI (US); James R. Yurgil, Livonia, MI (US); Xiaowen Dai, Farmington, MI (US); Thomas E. Bolander, Flint, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/862,222

(22) Filed: May 21, 2001

(65) Prior Publication Data

US 2002/0173903 A1 Nov. 21, 2002

(51) Int. Cl.[7] .............................................. G06F 19/00
(52) U.S. Cl. ...................... 701/117; 701/119; 701/35; 340/439
(58) Field of Search ............................... 701/117, 118, 701/119, 35, 96; 340/936, 903, 438, 439, 441, 436

(56) References Cited

U.S. PATENT DOCUMENTS

| | | | | |
|---|---|---|---|---|
| 5,305,214 A | * | 4/1994 | Komatsu | 701/35 |
| 5,373,446 A | * | 12/1994 | Mizukoshi | 303/95 |
| 5,410,477 A | | 4/1995 | Ishii et al. | 701/48 |
| 5,558,600 A | * | 9/1996 | Tsukamoto et al. | 477/121 |
| 5,897,602 A | * | 4/1999 | Mizuta | 701/201 |
| 6,226,577 B1 | * | 5/2001 | Yeo | 701/35 |

* cited by examiner

Primary Examiner—Tan Nguyen
(74) Attorney, Agent, or Firm—Anthony Luke Simon

(57) ABSTRACT

A method for continuously predicting the type of traffic in which a vehicle is traveling. The traffic pattern can be used in other vehicle control systems as an input to determine how to adjust system parameters, such as control loop proportional and integral gain calibrations. Vehicle speed is sampled over a variable number of sampling intervals, defining a prediction period. The prediction period varies as a function of distance traveled, and is limited for conditions where the distance interval is not reached within a particular time interval. When the prediction period is reached, average vehicle speed and speed variation over the period are determined. A lookup table incorporating average speed and speed variation is used to determine the traffic pattern. The prediction period can be shortened to quickly recognize transitions from city or highway traffic pattern.

16 Claims, 3 Drawing Sheets

ENVIRONMENTAL TRAFFIC RECOGNITION IDENTIFICATION PREDICTION STRATEGIES

BACKGROUND OF THE INVENTION

1. Field of the Invention

The present invention relates, in general, to control systems in internal combustion engines and, specifically, to the identification of a traffic pattern in which a vehicle is traveling for input into the vehicle control systems.

2. Description of the Art

A vehicle contains many control systems. The driving environment to which the vehicle is exposed affects the operation of many of these systems. In particular, the determination of following distance, resume rates, etc., in a radar cruise control system could benefit from knowing whether the vehicle is traveling in city, suburban, or highway traffic. Similarly, the type of traffic in which a vehicle is traveling could be used to vary the damping rate of shock absorbers to obtain the desired road "feel" in ride control systems.

Nothing in the vehicle controller currently takes traffic pattern into account.

SUMMARY OF THE INVENTION

The present invention is a method of and apparatus for determining the traffic pattern in which a vehicle is traveling as city, suburban or highway traffic. The method comprises the steps of sampling a speed of the vehicle at predetermined sampling intervals; establishing a prediction period; performing the sampling step until the end of the prediction period is reached; determining an average speed and a speed variation of the vehicle upon reaching the prediction period; and determining the traffic pattern using the average speed and the speed variation, preferably by using a lookup table.

The apparatus of the present invention comprises means for sampling a speed of the vehicle at predetermined sampling intervals; means for establishing a prediction period; means for performing the sampling step until the prediction period is reached; means for determining an average speed and a speed variation of the vehicle upon reaching the prediction period; and means for determining the traffic pattern using the average speed and the speed variation, preferably a lookup table.

The prediction period is a variable length of time over which sampling occurs. In a preferred aspect of the invention, the prediction period is the shorter of a time interval or the amount of time it takes to travel a distance interval. The prediction period thus varies as a function of distance traveled, and the prediction period is limited for conditions where the distance interval is not reached within the time interval. Therefore, the determination of the traffic pattern takes place quicker at higher speeds.

Adjustment of the prediction period can be used to quickly recognize transitions from one traffic pattern to another. In one aspect of the invention, this is done by comparing the average speed during the prediction period to a minimum speed when the traffic pattern is highway traffic and adjusting the distance interval by a first modifier based on the results of the comparing step. Specifically, if the average speed is less than the minimum speed, a transition from highway traffic is indicated. The modifier is used to reduce the time to the next prediction of the traffic pattern.

In another aspect of the invention, adjustment of the prediction period to quickly recognize transitions from one traffic pattern to another is done by comparing the average speed during the prediction period to a maximum speed when the traffic pattern is city traffic and adjusting the distance interval by a second modifier based on the results of the comparing step. Specifically, if the average speed is greater than the maximum speed, a transition from city traffic is indicated. The modifier is used to reduce the time to the next prediction of the traffic pattern.

The present invention, by identifying the traffic pattern type as city, suburban or highway, allows customization of the performance of a variety of powertrain control systems system based on traffic conditions. In cruise control systems, for example, the proportional gain and/or the integral gain used in the speed control algorithm will be a function of the traffic pattern. In addition, different gains for torque and/or braking control will be available for different traffic patterns. The method of the present invention is easy to calibrate and requires no additional hardware in order to function.

BRIEF DESCRIPTION OF THE DRAWINGS

The various features, advantages and other uses of the present invention will become more apparent by referring to the following detailed description and drawings in which.

DETAILED DESCRIPTION

The present invention is a method of determining whether a vehicle is in city, suburban or highway traffic. Generally, the method is performed in the engine controller, which is a conventional digital computer used by those in the art for engine control, including the standard elements of the central processing unit (CPU), random access memory, read-only memory, analog to digital convertor(s), input/output circuitry, and clock circuitry. The controller is activated upon application of ignition power to an engine, and it carries out a series of operations stored in an instruction-by-instruction format in memory for providing engine control, diagnostic and maintenance operations.

Figure 1:
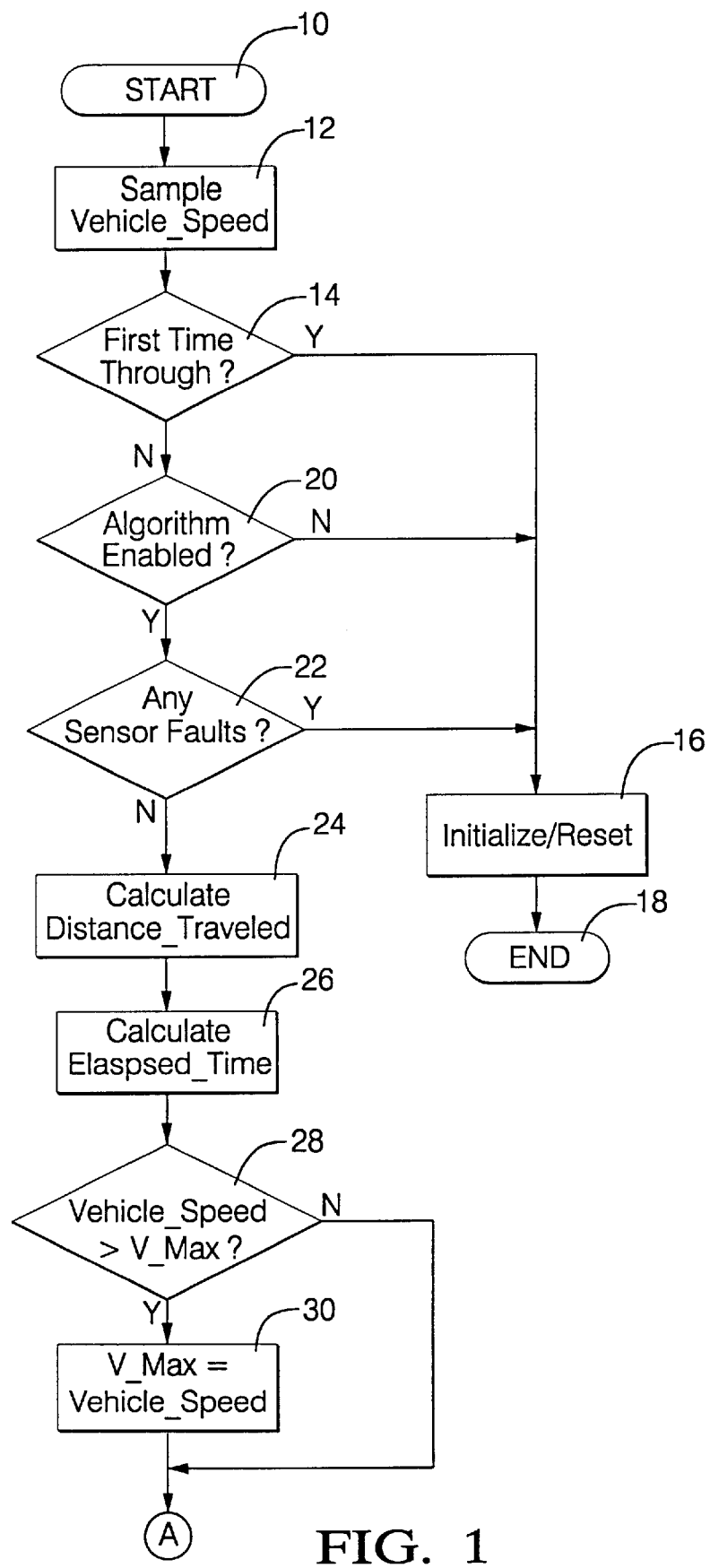
FIGS. 1 and 2 are flow diagrams illustrating the method of determining the traffic pattern in which a vehicle is traveling according to the present invention.

The procedure to determine the traffic pattern starts at step 10 of FIG. 1 and proceeds to step 12. In step 12, the procedure begins sampling and storing the vehicle speed at predetermined intervals, preferably at 1 sec intervals. In step 14, a query is made as to whether the procedure is being performed for the first time since engine startup by checking a flag that gets set the first time initialization is performed.

If it is the first time through, the variables used in the procedure are initialized in step 16 as shown below:
Traffic_Pattern=CITY;
Distance_Interval=KE_Dist_Cal;
Distance_Traveled=0;
Elapsed_Time=0;
V_Max=0;
V_Min=200;
V_Max_Previous=0;
V_Min_Previous=0;
Avg_Speed=0; and
Delta_Speed=0;
  where:
    Traffic_Pattern is the pattern of traffic in which the vehicle is traveling;
    Distance_Interval is the maximum distance interval over which the vehicle speed is monitored after initialization in order to determine the type of traffic in which the vehicle is traveling;
    KE_Dist_Cal is a constant, representing a nominal distance interval over which the vehicle speed is sampled to determine the type of traffic in which the vehicle is traveling;
    Distance_Traveled is the total distance traveled by the vehicle since initialization;
    Elapsed_Time is the total time traveled by the vehicle since initialization;
    V_Max is the maximum speed of the vehicle since initialization;
    V_Min is the minimum speed of the vehicle since initialization;
    V_Max_Previous is the maximum speed of the vehicle since initialization as of the previous sampling interval;
    V_Min_Previous is the minimum speed of the vehicle since initialization as of the previous sampling interval;
    Avg_Speed is the average speed of the vehicle from initialization through the current sampling interval; and
    Delta_Speed is the difference between the maximum speed and the minimum speed from initialization through the current sampling interval.

In addition, a flag is set upon the first initialization, indicating that the procedure has been performed at least once. After this initialization in step 16, the procedure ends at step 18 to await the start of the next sampling interval.

Returning now to step 14, if the procedure has already been performed at least once since the engine startup, a query is made in step 20 as to whether the algorithm is enabled. Preferably, the algorithm will be enabled if the engine is running and the vehicle is in the "Drive" transmission range. If it is not enabled, the procedure performs the initialization of step 16, then ends at step 18 until the vehicle speed is sampled again. Returning now to step 20, if the algorithm is enabled, the procedure advances to step 22. In step 22, a query is made as to whether there are any error codes associated with the vehicle speed sensor. If there is an error code, indicating a problem, the procedure resets through the initialization of step 16. The procedure then ends at step 18 to await the start of the next sampling interval. Returning now to step 22, if there is no error code, then the procedure advances to step 24.

In step 24, the total distance traveled by the vehicle since the last initialization is determined by adding the distance traveled by the vehicle during the sampling interval to the prior total distance traveled to obtain a new total distance traveled according to the following formula:

$$\text{Distance\_Traveled} + (\text{Vehicle\_Speed} * \text{Sample\_Rate}) = \text{Distance\_Traveled};$$

where:
  Vehicle_Speed is the sampled vehicle speed from step 12 in miles per hour; and
  Sample_Rate is the sampling interval in seconds.

By example, if the sampling interval is 1 sec, and the vehicle speed sampled in step 12 is 30 mph, then the total distance traveled at the end of the first sampling interval is:

$$0 \text{ mi} + (30 \text{ m/h} * 1 \text{ s} * \text{h}/3600 \text{ s}) = 0.0083 \text{ mi (or 44 feet)}.$$

Also by example, if the vehicle speed increases to 31 mph at the next sampling interval, the total distance traveled at the end of the second sampling interval is:

$$0.0083 \text{ mi} + (31 \text{ m/h} * 1 \text{ s} * \text{h}/3600 \text{ s}) = 0.0169 \text{ mi (about 89.5 feet)}.$$

After calculating total distance traveled in step 24, the procedure advances to step 26, where the total elapsed time since initialization is calculated by adding the sampling interval to the prior total elapsed time to obtain a new total elapsed time according to the following formula:

$$\text{Elapsed\_Time} + \text{Sampling\_Rate} = \text{Elapsed\_Time}.$$

By example, if the sampling interval is 1 sec, then the total time traveled after the first sampling interval is:

$$0 \text{ s} + 1 \text{ s} = 1 \text{ s}.$$

Similarly, the total time traveled after the second sampling interval is:

$$1 \text{ s} + 1 \text{ s} = 2 \text{ s}.$$

After calculating total time traveled in step 26, the procedure determines whether the vehicle has attained a new minimum or maximum speed since initialization. Specifically, the procedure advances to step 28, where a query is made as to whether Vehicle_Speed, sampled in step 12 is greater than V_Max. If Vehicle_Speed is greater than V_Max, then the vehicle has attained a new maximum speed. The procedure the advances to step 30, where V_Max is set equal to Vehicle_Speed. Then, the procedure advances step 32 in FIG. 2. Returning now to step 28 of FIG. 1, if Vehicle_Speed is not greater than V_Max, the procedure advances directly to step 32 of FIG. 2.

Figure 2:
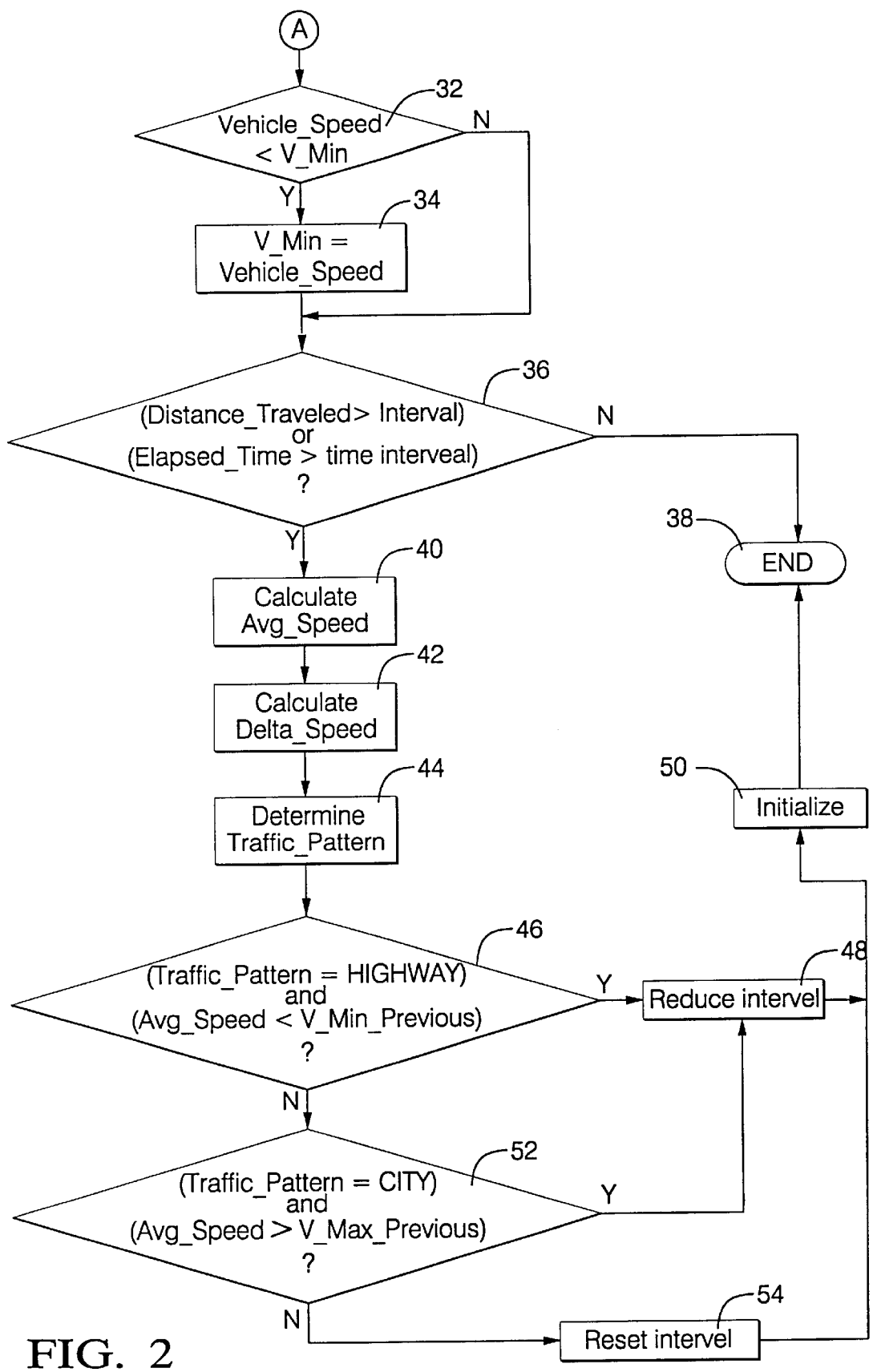

Referring now to FIG. 2, in step 32, a query is made as to whether Vehicle_Speed, sampled in step 12, is less than V_Min. If Vehicle_Speed is less than V_Min, then the vehicle has attained a new minimum speed. The procedure advances to step 34, where V_Min is set equal to Vehicle_Speed. Then, the procedure advances to step 36. Returning now to step 32, if Vehicle_Speed is not less than V_Min, the procedure advances directly to step 36.

The procedure continues to accumulate samples of vehicle speed until a prediction period is reached, which is when a prediction of the traffic pattern is made. The prediction period is the shorter of a particular period of time, called a time interval, or an amount of time it takes the vehicle to travel a particular distance, called a distance interval. For example, if the vehicle is traveling fast, the prediction period is limited by the amount of time it takes the vehicle to travel the distance interval. If the vehicle is traveling slow, particularly if it is stopped, the prediction period is limited to the time interval.

Whether a prediction period has been reached is checked in step 36, where Distance_Traveled from step 24 is compared to Distance_Interval and Elapsed_Time from step 26 is compared a maximum time interval, KE_Time_Cal. KE_Time_Cal is a constant representing the maximum amount of time that will be allowed to pass before a prediction of the traffic pattern is made, regardless of the distance traveled by the vehicle. Typical values for KE_Time_Cal are 60–180 seconds. Distance_Interval is a variable, representing the maximum distance interval over which the vehicle speed is monitored after initialization in order to determine the type of traffic in which the vehicle is traveling. Distance_Interval is initialized at KE_Dist_Cal in step 16. A typical range of values for KE_Dist_Cal is 0.5–2 miles.

If Distance_Traveled is less than or equal to Distance_Interval or Elapsed_Time is less than or equal to KE_Time_Cal in step 36, then a prediction period has not been reached, so sampling must continue. Thus, the procedure ends at step 38 to await the start of the next sampling interval. If, however, the Distance_Traveled is greater than Distance_Interval or Elapsed_Time is greater than KE_Time_Cal, then the prediction period has been reached, and Traffic_Pattern is determined.

The determination of the type of traffic in which a vehicle is traveling depends upon the average speed and the variation in speed over the prediction period. Specifically, the procedure advances to step 40, where the average speed over the prediction period, which is the average speed since initialization, Avg_Speed, is calculated according to the following formula:

$$Distance\_Traveled/Elapsed\_Time=Avg\_Speed.$$

Then, in step 42, the speed variation over the prediction period, which is the variation in speed since initialization, Delta_Speed, is calculated according to the following formula:

$$V\_Max-V\_Min=Delta\_Speed.$$

Figure 3:
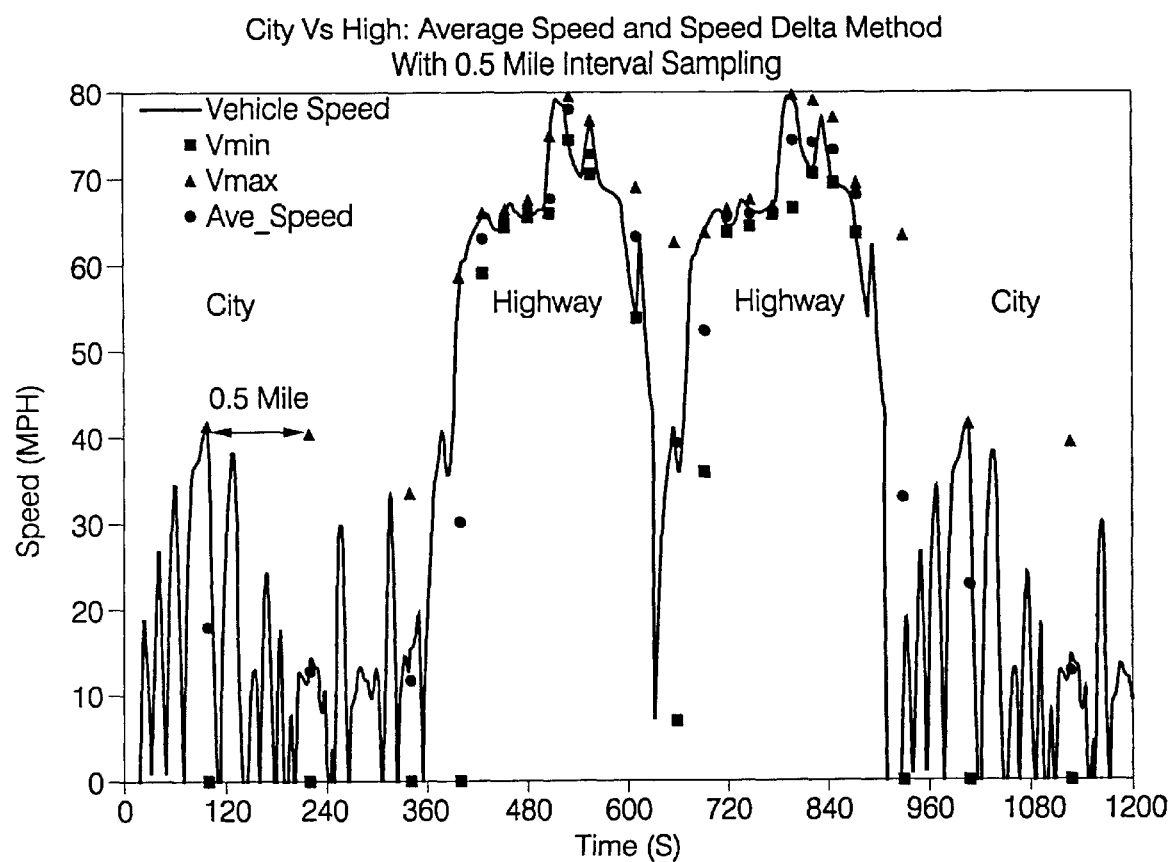
FIG. 3 is a graph of vehicle speed, average vehicle speed per interval, maximum vehicle speed per interval, and minimum vehicle speed per interval versus time for a vehicle traveling in a variety of traffic conditions.

In step 44, the average speed from step 40 and the speed variation from step 42 are used to determined the traffic pattern, Traffic_Pattern, in which the vehicle is traveling. Traffic_Pattern is determined by use of a lookup table, preferably derived based on experimental results. The results of such an experiment are illustrated in FIG. 3. FIG. 3 shows vehicle speed for a vehicle driving in a variety of traffic conditions for 15 minutes. The data is duplicated after 15 minutes to get more data points. Every 0.5 mile, average vehicle speed, maximum vehicle speed, and minimum vehicle speed during that period are determined and shown.

Figure 4:
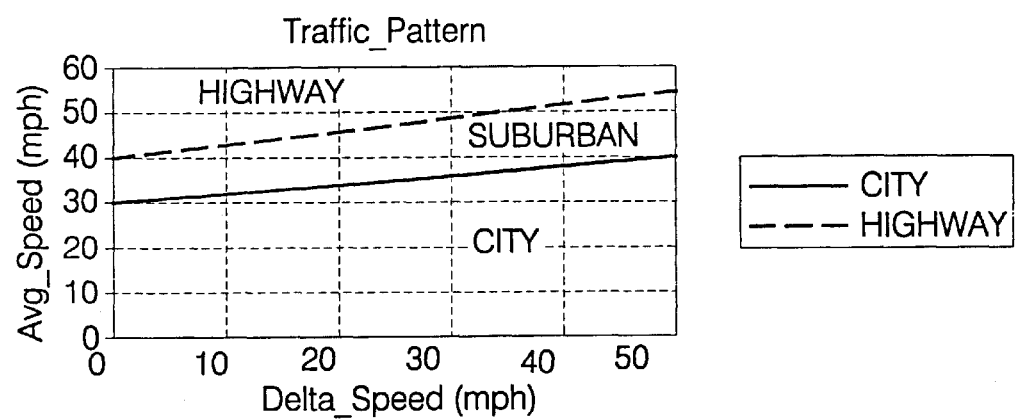
FIG. 4 is a graphical representation of a lookup table used in the present invention incorporating the data points of FIG. 3.

A graphical illustration of a lookup table derived from the data points of FIG. 3 is shown in FIG. 4. The value that comes out of the table, Traffic_Pattern, could have more than the three discrete values (CITY, SUBURBAN and HIGHWAY) shown. There could be multiple levels associated with each of the three major traffic patterns. For example, CITY could be subdivided into low and high CITY patterns. As seen in FIG. 4, a high average speed with little variation between minimum and maximum speed indicates highway traffic. Low average speed with greater variations in speed between minimum and maximum indicates city traffic. By example, if the average speed is 20 mph, with a speed variation of 30 mph, city traffic is indicated. Also by example, if the average speed is 50 mph, with a speed variation of 10 mph, highway traffic is indicated.

Returning now to FIG. 2, after a prediction of TRAFFIC_PATTERN is made in step 44, the procedure advances to initialize the next prediction period. As mentioned, the prediction of the pattern of traffic in which the vehicle is traveling can be reported as a finer subcategory of the major regions, CITY, SUBURBAN and HIGHWAY. In a preferred aspect of the invention, however, it is sufficient to combine the subcategories into their major regions for use in initializing the next prediction period.

The first action taken to initialize the next prediction period is to determine whether the distance interval should be altered. If the distance interval, Distance_Interval, is shortened, it can be used to quickly recognize changes in the traffic pattern from one region to another. Thus, after Traffic_Pattern is determined in step 44, the procedure advances to step 46 where queries are made as to whether the traffic in which the vehicle is driving is a highway pattern (Traffic_Pattern=HIGHWAY) and whether the average speed from step 40 is less than the minimum speed from the previous sampling interval (Avg_Speed<V_Min_Previous). The purpose of this query is to recognize a transition from highway traffic. For example, the average speed will be less than the minimum speed of the previous sampling period when the vehicle has entered an exit ramp from a highway. If both conditions in step 46 are satisfied, the procedure advances to step 48. In step 48, the distance interval over which the vehicle speed is monitored for the next prediction period is shortened. Specifically, Distance_Interval is reduced by a modifier according to the following formula:

$$KE\_Dist\_Cal-KE\_HW\_Mod=Distance\_Interval;$$

where:
KE_HW_Mod is a predetermined constant. A preferred value for KE_HW_Mod is 0.5 mile, but its value can range from zero to KE_Dist_Cal.

After reducing Distance_Interval for the next prediction period, the remainder of the variables needed for the next prediction period are initialized in step 50, preferably by setting the variables to the following indicated values:
Distance_Traveled=0;
Elapsed_Time=0;
V_Max Previous=V_Max;
V_Min_Previous=V_Min;
V_Max =0; and
V_Min=0.
The procedure then ends at step 38 to await the start of the next sampling interval.

Returning now to step 46, if Traffic_Pattern is not equal to HIGHWAY or Avg_Speed is greater than or equal to V_Min_Previous, then the procedure advances to step 52. In step 52, queries are made whether the traffic in which the vehicle is driving is a city pattern (Traffic_Pattern=CITY)

and whether the average speed from step 40 is greater than the maximum speed from the previous sampling interval (Avg_Speed>V_Max_Previous). The purpose of this query is to recognize a transition from city traffic. For example, the average speed will be greater than the maximum speed of the previous sampling period when a vehicle travels an entrance ramp on to a highway. If both conditions in step 52 are satisfied, the procedure advances to step 48. In step 48, the distance interval over which the vehicle speed is monitored for the next prediction period is shortened. Specifically, Distance_Interval is reduced by a modifier according to the following formula:

KE_Dist_Cal-KE_City_Mod=Distance_Interval;

where:

KE_City_Mod is a predetermined constant. Generally, KE_City_Mod is larger than

KE_HW_Mod because it is expected that the distance interval needed for detection of a transition from highway traffic is larger than the distance interval needed for detection of a transition from city traffic. A preferred value for KE_City_Mod is 1.5 miles, but its value can range from zero to KE_Dist_Cal.

After Distance_Interval is reduced in step 48, the next prediction period is initialized in step 50, preferably by setting the variables as described previously. The procedure then ends at step 38 to await the start of the next sampling interval.

Returning now to step 52, if Traffic_Pattern is not equal to CITY or Avg_Speed is less than or equal to V_Max_Previous, then the procedure advances to step 54. By example, if Traffic_Pattern is equal to SUBURBAN, the procedure would advance to step 54. Also by example, if Traffic_Pattern is equal to HIGHWAY, but the average speed is greater than the minimum speed from the previous sampling interval (Avg_Speed>V_Min_Previous), then the procedure will advance to step 54. In step 54, Distance_Interval is set equal to KE_Dist_Cal. The procedure then advances to step 50 to initialize the next prediction period as described previously. The procedure ends at step 38 to await the start of the next sampling interval.

Thus, the present invention provides a method and apparatus to identify the type of traffic in which a vehicle is traveling. By identifying the traffic pattern, customization of the performance of a variety of powertrain control systems based on the traffic pattern is possible. The invention has particular applicability to provide an input into a radar cruise control system.

What is claimed is:

1. A method of determining a traffic pattern in which a vehicle is traveling, comprising the steps of:
    sampling a speed of the vehicle at predetermined sampling intervals;
    establishing a prediction period;
    performing the sampling step until the prediction period is reached;
    determining an average speed and a speed variation of the vehicle upon reaching the prediction period; and
    determining the traffic pattern using the average speed and the speed variation.

2. The method according to claim 1, wherein the step of determining the traffic pattern comprises the step of using a lookup table incorporating the average speed and the speed variation.

3. The method according to claim 1, wherein the prediction period is the shorter of a time interval and an amount of time it takes to travel a distance interval.

4. The method according to claim 3, further comprising the steps of:
    comparing the average speed during the prediction period to a minimum speed when the traffic pattern is highway traffic; and
    adjusting the distance interval by a first distance modifier based on a result of the comparing step.

5. The method according to claim 4, wherein the step of adjusting the distance interval by a first distance modifier comprises the step of subtracting the first distance modifier from the distance interval when the result of the comparing step shows that the average speed is less than the minimum speed.

6. The method according to claim 3, further comprising the steps of:
    comparing the average speed during the prediction period to a maximum speed when the traffic pattern is city traffic; and
    adjusting the distance interval by a second distance modifier based on a result of the comparing step.

7. The method according to claim 6, wherein the step of adjusting the distance interval by a second distance modifier comprises the step of subtracting the second distance modifier from the distance interval when the result of the comparing step shows that the average speed is less than the maximum speed.

8. The method according to claim 3, further comprising the steps of:
    performing a first comparison step by comparing the average speed during the prediction period to a minimum speed when the traffic pattern is highway traffic;
    performing a second comparison step by comparing the average speed during the prediction period to a maximum speed when the traffic pattern is city traffic;
    adjusting the distance interval by subtracting a first distance modifier from the distance interval when the first comparison step shows that the average speed is less than the minimum speed;
    adjusting the distance interval by subtracting a second distance modifier from the distance interval when the second comparison step shows that the average speed is less than the maximum speed.

9. An apparatus for determining a traffic pattern in which a vehicle is traveling, comprising:
    means for sampling a speed of the vehicle at predetermined sampling intervals;
    means for establishing a prediction period;
    means for performing the sampling step until the prediction period is reached;
    means for determining an average speed and a speed variation of the vehicle upon reaching the prediction period; and
    means for determining the traffic pattern using the average speed and the speed variation.

10. The apparatus according to claim 9, wherein the means for determining the traffic pattern comprises a lookup table incorporating the average speed and the speed variation.

11. The apparatus according to claim 9, wherein the prediction period is the shorter of a time interval and an amount of time it takes to travel a distance interval.

12. The apparatus according to claim 11, further comprising:
   means for comparing the average speed during the prediction period to a minimum speed when the traffic pattern is highway traffic; and
   means for adjusting the distance interval by a first distance modifier based on a result of the comparing step.

13. The apparatus according to claim 12, wherein the means for adjusting the distance interval by a first distance modifier comprises means for subtracting the first distance modifier from the distance interval when the result of the comparing step shows that the average speed is less than the minimum speed.

14. The apparatus according to claim 11, further comprising:
   means for comparing the average speed during the prediction period to a maximum speed when the traffic pattern is city traffic; and
   means for adjusting the distance interval by a second distance modifier based on a result of the comparing step.

15. The apparatus according to claim 14, wherein the means for adjusting the distance interval by a second distance modifier comprises means for subtracting the second distance modifier from the distance interval when the result of the comparing step shows that the average speed is less than the maximum speed.

16. The apparatus according to claim 11, further comprising:
   means for performing a first comparison step by comparing the average speed during the prediction period to a minimum speed when the traffic pattern is highway traffic;
   means for performing a second comparison step by comparing the average speed during the prediction period to a maximum speed when the traffic pattern is city traffic;
   means for adjusting the distance interval by subtracting a first distance modifier from the distance interval when the first comparison step shows that the average speed is less than the minimum speed.
   means for adjusting the distance interval by subtracting a second distance modifier from the distance interval when the second comparison step shows that the average speed is less than the maximum speed.

* * * * *